United States Patent
Sugaya

(10) Patent No.: US 9,858,725 B2
(45) Date of Patent: Jan. 2, 2018

(54) SERVER AND METHOD FOR THREE-DIMENSIONAL OUTPUT

(71) Applicant: OPTiM CORPORATION, Saga (JP)

(72) Inventor: Shunji Sugaya, Tokyo (JP)

(73) Assignee: OPTiM Corporation, Saga-shi (JP)

( * ) Notice: Subject to any disclaimer, the term of this patent is extended or adjusted under 35 U.S.C. 154(b) by 0 days.

(21) Appl. No.: 15/157,649

(22) Filed: May 18, 2016

(65) Prior Publication Data
US 2017/0024932 A1    Jan. 26, 2017

(30) Foreign Application Priority Data
Jul. 24, 2015 (JP) ................................. 2015-147234

(51) Int. Cl.
| | |
|---|---|
| G06T 15/00 | (2011.01) |
| G06T 19/00 | (2011.01) |
| G06F 3/01 | (2006.01) |
| G02B 27/01 | (2006.01) |
| G02B 27/00 | (2006.01) |

(52) U.S. Cl.
CPC ........ G06T 19/006 (2013.01); G02B 27/0093 (2013.01); G02B 27/017 (2013.01); G06F 3/013 (2013.01); G02B 2027/0187 (2013.01)

(58) Field of Classification Search
CPC .............. G06T 19/006; G02B 27/0093; G02B 27/017; G06F 3/013
USPC ......................................................... 345/419
See application file for complete search history.

(56) References Cited

FOREIGN PATENT DOCUMENTS

JP    2014-086091    5/2014

OTHER PUBLICATIONS

Lyon, Phillip Adam. Head Motion Controls for 3D Head Mounted Display Games. Diss. Drexel University, 2014.*

* cited by examiner

Primary Examiner — Phu K Nguyen
(74) Attorney, Agent, or Firm — Lex IP Meister, PLLC

(57) ABSTRACT

The present invention is to provide a server and a method for three-dimensional output that easily determines the user's line of sight in a virtual reality space. The server for three-dimensional output being communicatively connected with a head mounted display outputting full dome three-dimensional space data as virtual or augmented reality corresponding to a user's line of sight sequentially transmits screen data to be output to and displayed on the head mounted display; receives data on the turn in the yaw direction and the pitch direction of the head mounted display from the head mounted display; changes the screen data based on the received turn in the yaw direction and the pitch direction of the head mounted display; and changes avatar data on the user of the head mounted display based on the received turn in the yaw direction and the pitch direction of the head mounted display.

9 Claims, 9 Drawing Sheets

CHARACTER TABLE

| CHARACTER NAME | AVATAR IMAGE |
|---|---|
| CHARACTER A |  |
| CHARACTER B |  |
| CHARACTER C |  |
| CHARACTER D |  |

Fig. 6

IDENTIFIER TABLE

| DEVICE IDENTIFIER | USERNAME | AVATAR DATA |
|---|---|---|
| AAAA | USER 1 | CHARACTER A |
| BBBB | USER 2 | CHARACTER B |
| CCCC | USER 3 | CHARACTER C |
| DDDD | USER 4 | CHARACTER D |

SERVER AND METHOD FOR THREE-DIMENSIONAL OUTPUT

CROSS REFERENCE TO RELATED APPLICATIONS

This application claims priority to Japanese Patent Application No. 2015-147234 filed on Jul. 24, 2015, the entire contents of which are incorporated by reference herein.

TECHNICAL FIELD

The present invention relates to a server for three-dimensional output that is communicatively connected with a head mounted display, which outputs full dome three-dimensional space data as virtual or augmented reality corresponding to a user's line of sight.

BACKGROUND ART

Recently, servers for three-dimensional output have been known to transmit screen data such as three-dimensional space data to a head mounted display to make this head mounted display output full dome three-dimensional space data corresponding to the user's line of sight.

In such servers for three-dimensional output, the screen data includes avatar data on avatars virtually displaying users in a virtual three-dimensional space.

In such avatar display, the constitution in which for example, the avatar is positioned based on location information on the eyeballs of a user who wears a head mounted display is disclosed (refer to Patent Document 1).

CITATION LIST

Patent Literature

Patent Document 1: JP 2014-86091A

SUMMARY OF INVENTION

Patent Document 1 describes that the user's head is positioned based on the location information on the two eyeballs, the first eyeball and the second eyeball, to move the avatar.

However, in the constitution of Patent Document 1, only the entire avatar is moved, and a part of the avatar, for example, the head is hardly turned around.

Then, the present invention focuses on the position that the head of the avatar is turned around to easily determine the user's line of sight in a virtual reality space.

An objective of the present invention is to provide a server and a method for three-dimensional output that easily determines the user's line of sight in a virtual reality space.

The first aspect of the present invention provides a server for three-dimensional output, the server being communicatively connected with a head mounted display and outputting full dome three-dimensional space data as virtual or augmented reality corresponding to a user's line of sight, including:

a screen data transmitting unit that sequentially transmits screen data to be output to and displayed on the head mounted display;

a direction data receiving unit that receives data on the turn in the yaw direction and the pitch direction of the head mounted display from the head mounted display;

a screen data changing unit that changes the screen data based on the received turn in the yaw direction and the pitch direction of the head mounted display; and an avatar data changing unit that changes avatar data on the user of the head mounted display based on the received turn in the yaw direction and the pitch direction of the head mounted display.

According to the first aspect of the present invention, a server for three-dimensional output being communicatively connected with a head mounted display and outputting full dome three-dimensional space data as virtual or augmented reality corresponding to a user's line of sight sequentially transmits screen data to be output to and displayed on the head mounted display; receives data on the turn in the yaw direction and the pitch direction of the head mounted display from the head mounted display; changes the screen data based on the received turn in the yaw direction and the pitch direction of the head mounted display; and changes avatar data on the user of the head mounted display based on the received turn in the yaw direction and the pitch direction of the head mounted display.

The first aspect of the present invention falls into the category of a server for three-dimensional output, but the category of a method for three-dimensional output has the same functions and effects.

The second aspect of the present invention provides the server according to the first aspect of the present invention, in which the avatar data changing unit changes the direction of the head of the avatar data.

According to the second aspect of the present invention, the server according to the first aspect of the present invention changes the direction of the head of the avatar data.

The third aspect of the present invention provides a method for three-dimensional output, the method outputting full dome three-dimensional space data as virtual or augmented reality corresponding to a user's line of sight, including the steps of sequentially transmitting screen data to be output to and displayed on the head mounted display;

receiving data on the turn in the yaw direction and the pitch direction of the head mounted display from the head mounted display;

changing the screen data based on the received turn in the yaw direction and the pitch direction of the head mounted display; and changing avatar data on the user of the head mounted display based on the received turn in the yaw direction and the pitch direction of the head mounted display.

The present invention can provide a server and a method for three-dimensional output that easily determines the user's line of sight in a virtual reality space.

BRIEF DESCRIPTION OF DRAWINGS

FIG. 6 shows the identifier table stored by the server for three-dimensional output 10.

DESCRIPTION OF EMBODIMENTS

Embodiments of the present invention will be described below with reference to the attached drawings. However, these are illustrative only, and the scope of the present invention is not limited thereto.

Overview of System for Three-Dimensional Output 1

Figure 1:
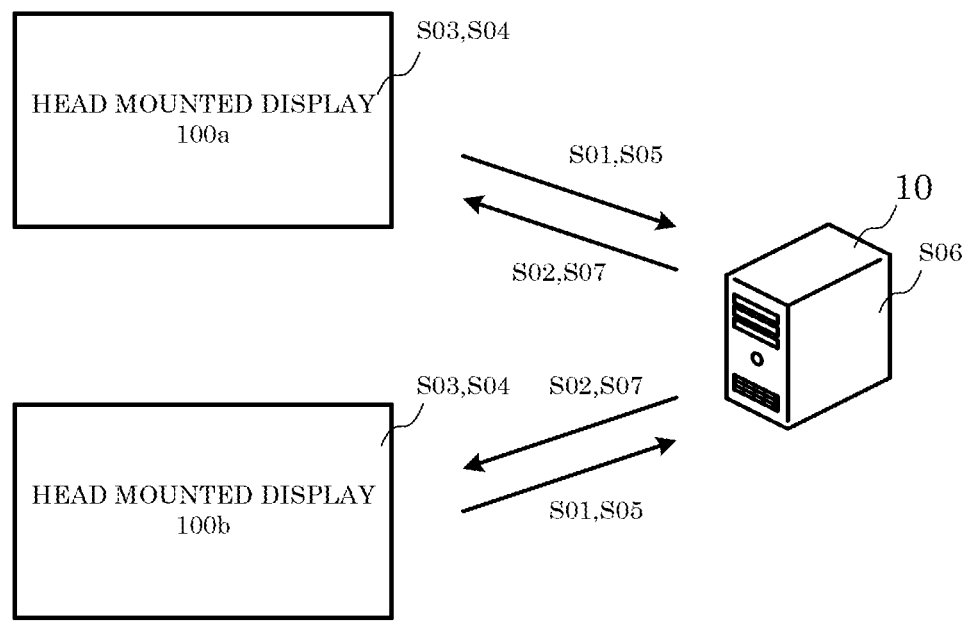
FIG. 1 shows a schematic diagram of the system for three-dimensional output 1.

FIG. 1 shows an overview of the system for three-dimensional output 1 according to a preferable embodiment of the present invention. The system for three-dimensional output 1 includes a server for three-dimensional output 10 and a head mounted display 100*a*, 100*b* (hereinafter referred to as "head mounted display 100" unless otherwise specified).

The server for three-dimensional output 10 can be communicatively connected with the head mounted display 100. The server for three-dimensional output 10 transmits screen data to be output to and displayed on the head mounted display 100 to the head mounted display 100. The server for three-dimensional output 10 also receives direction data on the turn in the yaw direction and the pitch direction of the head mounted display 100. The server for three-dimensional output 10 changes the screen data output to and displayed on the head mounted display 100 based on the received direction data. The server for three-dimensional output 10 also changes avatar data on the user of the head mounted display 100 that has transmitted the direction data based on the received direction data and transmits the avatar data on the user to the head mounted display 100. Specifically, the server for three-dimensional output 10 changes the direction of the face of the avatar data.

The head mounted display 100 covers user's eyes to output and display three-dimensional space data as virtual or augmented reality. The head mounted display 100 is communicatively connected with the server for three-dimensional output 10 to receive the screen data from the server for three-dimensional output 10 and to transmit the direction data to the server for three-dimensional output 10. The head mounted display 100 outputs full dome three-dimensional space data corresponding to a user's line of sight. The head mounted display 100 has a sensor that detects the turn in the yaw direction and the pitch direction of the head mounted display 100. The head mounted display 100 transmits the direction data on the detected turn in the yaw direction and the pitch direction to the server for three-dimensional output 10.

First, the server for three-dimensional output 10 identifies the head mounted display 100 to which screen data as three-dimensional space data is transmitted (step S01). In the step S01, the server for three-dimensional output 10 acquires identification data on the identifier of the head mounted display 100 communicatively connected with the server for three-dimensional output 10 and identifies various data on the devices of the type, the number, etc., of the head mounted display 100 connected with the server for three-dimensional output 10.

The server for three-dimensional output 10 sequentially transmits screen data to the identified head mounted display 100 (step S02). In the step S02, the screen data transmitted from the server for three-dimensional output 10 contains avatar data on the avatar of a user who wears the head mounted display 100, article data on an article, etc., arranged in a virtual three-dimensional space, and spatial data on the virtual three-dimensional space.

The head mounted display 100 receives the screen data transmitted from the server for three-dimensional output 10 and displays a virtual three-dimensional space based on this screen data (step S03). In the step S03, the head mounted display 100 displays an avatar representing the user, a virtual three-dimensional space, and an article arranged in the virtual three-dimensional space based on the avatar data, the article data, and the spatial data contained in this screen data.

The head mounted display 100 determines the change in the direction of the face of a user who wears the head mounted display 100 based on the change in the turn in the yaw direction and the pitch direction of the head mounted display 100 (step S04).

If detecting the change in the yaw direction and the pitch direction, the head mounted display 100 transmits direction data on the detected turn in the yaw direction and the pitch direction to the server for three-dimensional output 10 (step S05).

The server for three-dimensional output 10 receives the direction data transmitted from the head mounted display 100 and changes the image data of the user who wears this head mounted display 100 based on the received direction data (step S06). In the step S06, the server for three-dimensional output 10 changes the avatar data, the article data, and spatial data. For the avatar data, the server for three-dimensional output 10 changes the direction of the face of the avatar data. Specifically, the server for three-dimensional output 10 changes the direction of the face of the avatar data based on the received direction data.

The server for three-dimensional output 10 transmits the changed image data to the head mounted display 100 (step S07).

The head mounted display 100 receives the image data transmitted from the server for three-dimensional output 10 and displays a virtual three-dimensional space based on this image data (step S08).

Configuration of System for Three-Dimensional Output 1

Figure 2:
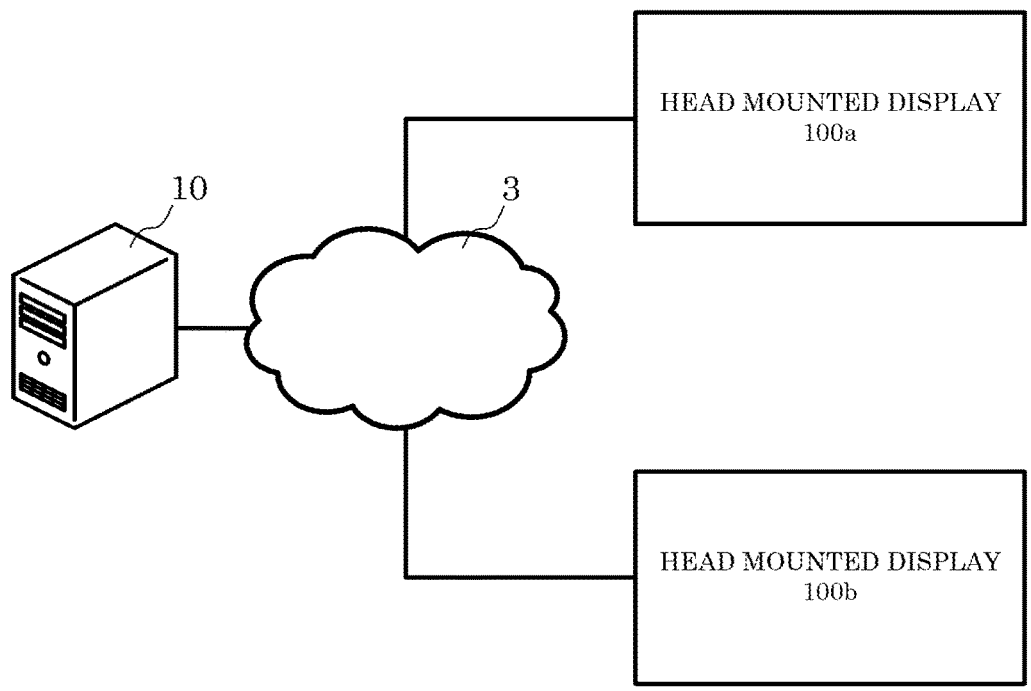
FIG. 2 shows a configuration diagram of the system for three-dimensional output 1.

FIG. 2 shows a configuration diagram of the system for three-dimensional output 1 according to a preferable embodiment of the present invention. The system for three-dimensional output 1 includes a server for three-dimensional output 10, a head mounted display 100*a*, 100*b* (hereinafter referred to as "head mounted display 100" unless otherwise specified), and a public line network 3 (e.g. the Internet network, a third or a fourth generation network).

The server for three-dimensional output 10 is a server device with the functions to be described later, which performs data communication with the head mounted display 100.

The server for three-dimensional output 10 sequentially transmits screen data to be output to and displayed on the head mounted display 100 to the head mounted display 100. The server for three-dimensional output 10 also receives direction data on the turn in the yaw direction and the pitch direction of the head mounted display 100. The server for three-dimensional output 10 changes the screen data based on the received direction data. The server for three-dimensional output 10 identifies the head mounted display 100 that has transmitted the direction data, based on the received direction data, and changes the avatar data on the user of this head mounted display 100. The server for three-dimensional output 10 changes the avatar data by changing the direction of the face of the avatar data.

The head mounted display 100 has the functions to be described later, which covers user's eyes to output and display full dome three-dimensional space data as virtual or augmented reality corresponding to a user's line of sight.

The head mounted display 100 performs data communication with the server for three-dimensional output 10. The head mounted display 100 displays a virtual three-dimensional space based on the three-dimensional data transmitted from the server for three-dimensional output 10. The head mounted display 100 has a device such as a sensor that detects the direction data on the turn in the yaw direction and the pitch direction of the head mounted display 100. The head mounted display 100 transmits the detected direction data to the server for three-dimensional output 10.

Functions

Figure 3:
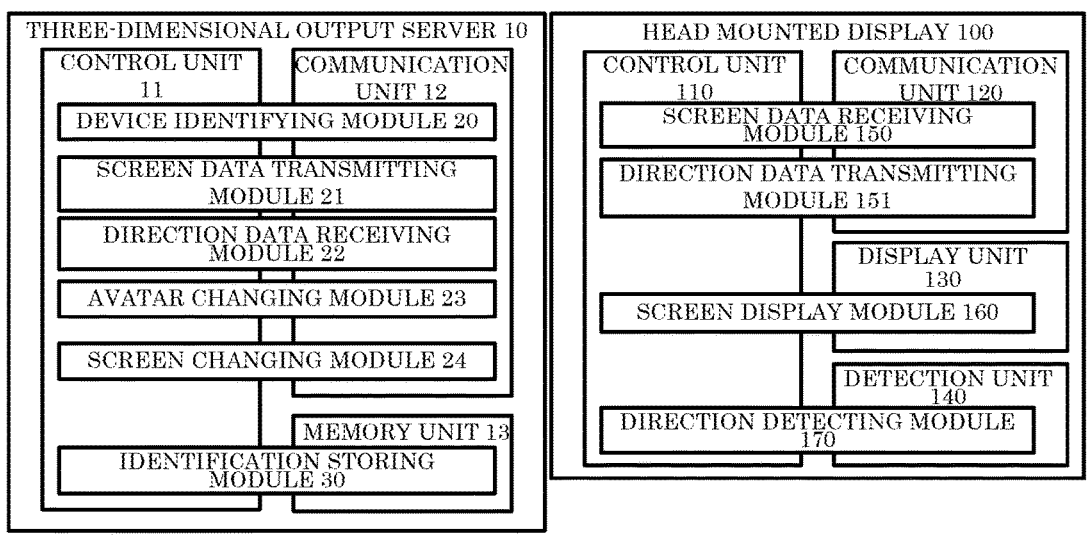
FIG. 3 shows a functional block diagram of the server for three-dimensional output 10 and the head mounted display 100.

FIG. 3 shows a functional block diagram of the server for three-dimensional output 10 and the head mounted display 100 to illustrate the relationship among the functions.

The server for three-dimensional output 10 includes a control unit 11 including a central processing unit (hereinafter referred to as "CPU"), a random access memory (hereinafter referred to as "RAM"), and a read only memory (hereinafter referred to as "ROM"); and a communication unit 12 including a Wireless Fidelity or Wi-Fi® enabled device complying with, for example, IEEE 802.11, or a wireless device complying with the IMT-2000 standard such as the third generation mobile communication system. The server for three-dimensional output 10 may include a wired device for LAN connection.

The server for three-dimensional output 10 also includes a memory unit 13 such as a hard disk, a semiconductor memory, a record medium, or a memory card to store data. The memory unit 13 includes the character table and the identifier table that are to be described later.

In the server for three-dimensional output 10, the control unit 11 reads a predetermined program to run a device identifying module 20, a screen data transmitting module 21, a direction data receiving module 22, an avatar changing module 23, and a screen changing module 24 in cooperation with the communication unit 12. Furthermore, in the server for three-dimensional output 10, the control unit 11 reads a predetermined program to run an identification storing module 30 in cooperation with the memory unit 13.

In the same way as the server for three-dimensional output 10, the head mounted display 100 includes a control unit 210 including a CPU, a RAM, and a ROM; and a communication unit 220 including a Wireless Fidelity or Wi-Fi® enabled device complying with, for example, IEEE 802.11, or a wireless device complying with the IMT-2000 standard such as the third generation mobile communication system. The head mounted display 100 may include a wired device for LAN connection.

The head mounted display 100 also includes a device that outputs and displays data and images controlled by the control unit 110 as a display unit 130. The head mounted display 100 has a device such as a sensor that detects the turn in the yaw direction and the pitch direction of the head mounted display 100 as a detection unit 140.

In the head mounted display 100, the control unit 110 reads a predetermined program to run a screen data receiving module 150 and a direction data transmitting module 151 in cooperation with the communication unit 120. Furthermore, in the head mounted display 100, the control unit 110 reads a predetermined program to run a screen display module 160 in cooperation with the display unit 130. Still furthermore, in the head mounted display 100, the control unit 110 reads a predetermined program to run a direction detecting module 170 in cooperation with the detection unit 140.

Three-Dimensional Output Process

Figure 4:
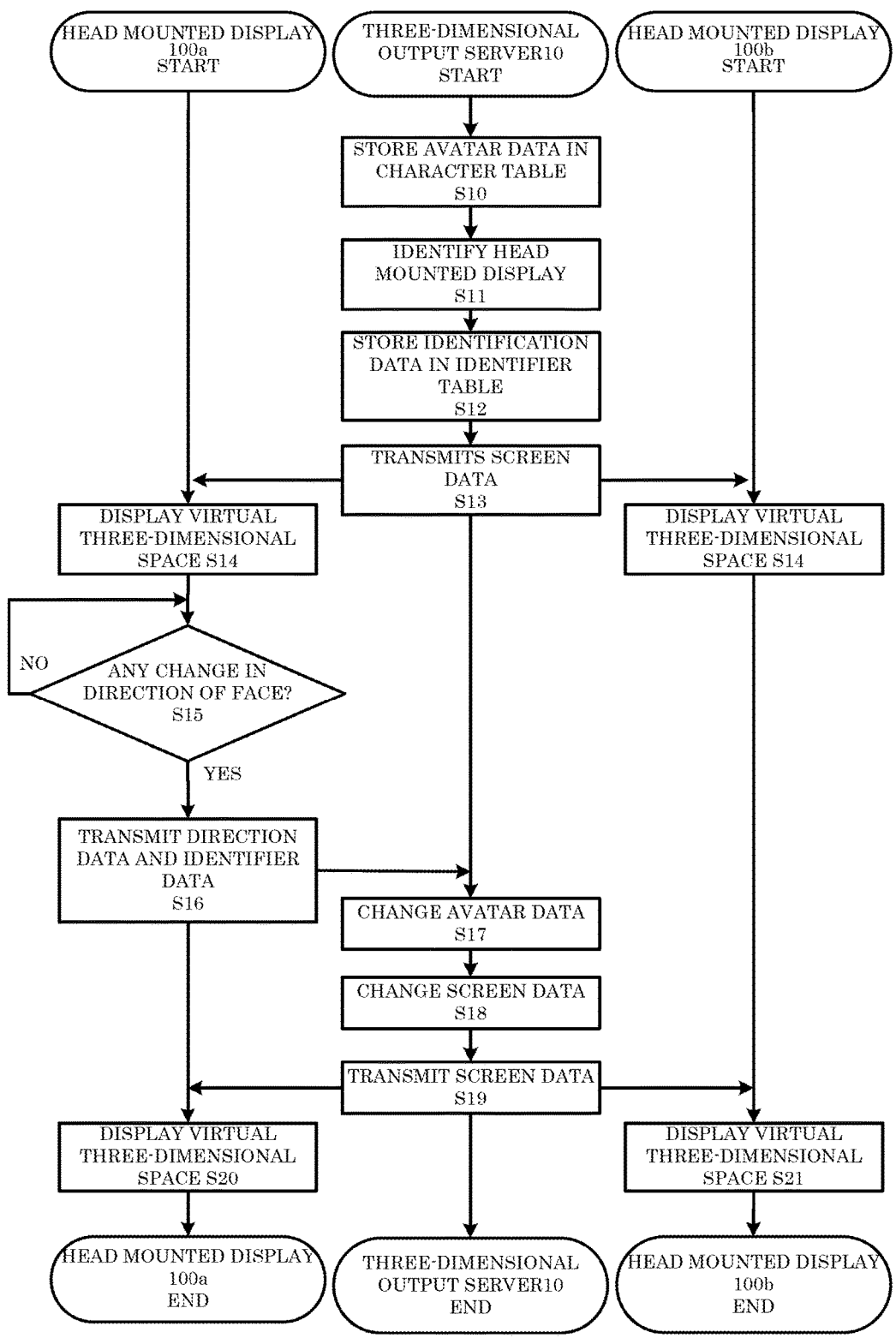
FIG. 4 shows a flow chart illustrating the three-dimensional output process performed by the server for three-dimensional output 10 and the head mounted display 100.

FIG. 4 shows a flow chart illustrating the three-dimensional output process performed by the server for three-dimensional output 10 and the head mounted display 100. The tasks executed by the modules of each of the above-mentioned devices will be explained below together with this process.

Figure 5:
FIG. 5 shows the character table stored by the server for three-dimensional output 10.
Figure 5:
Figure 5:
Figure 5:

The identifier storing module 30 of the server for three-dimensional output 10 previously associates and stores an avatar image to be displayed in a three dimensional space with a character name as the identifier of this avatar image in the character table shown in FIG. 5 (step S10).

Character Table

FIG. 5 shows the character table stored by the identifier storing module 30 of the server for three-dimensional output 10. The identifier storing module 30 associates and stores an avatar image with a character name as the identifier of this avatar image. The avatar image and the character name may be previously generated by the user and then acquired and stored, or may be previously prepared.

The device identifying module 20 of the server for three-dimensional output 10 identifies the head mounted display 100 to which screen data as three-dimensional space data is transmitted (step S11). In the step S11, the device identifying module 20 acquires identification data as the identifier of the head mounted display 100 connected with the server for three-dimensional output 10 and the user ID as the identifier of the user who wears this head mounted display 100.

The identifier storing module 30 of the server for three-dimensional output 10 associates and stores the identification data of the head mounted display 100 and the user ID with the character name as the identifier of the avatar image that the user displays as the virtual self, in the identifier table shown in FIG. 6 (step S12).

Identifier Table

FIG. 6 shows the identifier table stored by the identifier storing module 30 of the server for three-dimensional output 10. The identifier storing module 30 stores identification data that is the identifier of the head mounted display 100 identified by the device identifying module 20, as a device identifier. The identifier storing module 30 also stores the user ID that is the identifier of the user who wears the head mounted display 100 identified by the device identifying module 20, as a username. The identifier storing module 30 also stores the character name of the avatar image associated with this username as avatar data. The avatar data stored by the identifier storing module 30 may previously set by the user or the three-dimensional output 10.

The screen data transmitting module 21 of the server for three-dimensional output 10 sequentially transmits three-dimensional data as screen data to the identified head mounted display 100 (step S13). In the step S13, the screen data transmitted from the screen data transmitting module 21 contains avatar data on the avatar as the virtual self of a user who wears the head mounted display 100, spatial data on a virtual three-dimensional space, and article data on an article, etc., arranged in this virtual three-dimensional space. The screen data transmitting module 21 may transmit data other than the above-mentioned data as screen data.

The screen data receiving module 150 of the head mounted display 100 receives the screen data transmitted from the server for three-dimensional output 10. The screen display module 160 of the head mounted display 100 displays the virtual three-dimensional space, the article, and the avatar based on the received screen data (step S14). In the step S14, the screen display module 160 displays the screen shown in FIG. 7 on the head mounted display 100.

Figure 7:
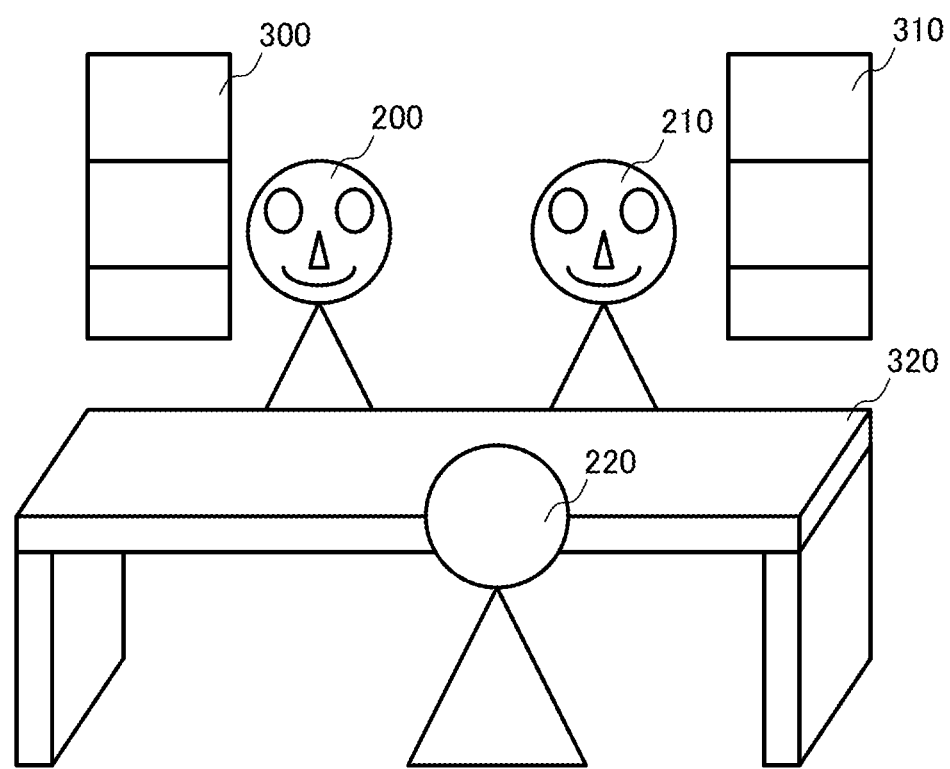
FIGS. 7, 8 and 9 show a diagram illustrating a virtual three-dimensional space displayed on the head mounted display 100.

In FIG. 7, the screen display module 160 of the head mounted display 100 displays avatars 200, 210, and 220 and articles 300, 310, and 320 in a virtual three-dimensional space. The screen display module 160 displays a full dome screen with a central focus on the user on the head mounted display 100. However, this embodiment is explained based on the expedient assumption that the user looks from behind the avatar 220. In the description below, the user who wears the head mounted display 100a is assumed to be represented by the avatar 200. The user who wears the head mounted display 100a is also assumed to turn the face around to see the avatar 210.

The direction detecting module 170 of the head mounted display 100a judges whether or not the direction of the face of the user who wears the head mounted display 100a has been changed (step S15). In the step S15, the direction detecting module 170 judges whether or not the head mounted display 100a has been turned in the yaw direction and the pitch direction to judge whether or not the direction of the face of the user has been changed. In this embodiment, the yaw direction and the pitch direction means the turn directions around the vertical axis and the horizontal axis of the head mounted display 100a, respectively.

In the step S15, if judging that the head mounted display 100a has been not turned in the yaw direction or the pitch direction (NO), the direction detecting module 170 of the head mounted display 100a repeats this process until detecting the turn.

On the other hand, in the step S15, if judging that the head mounted display 100a has been turned in the yaw direction and the pitch direction (YES), the direction detecting module 170 calculates the angles of the turn in the yaw direction and the pitch direction. The direction data transmitting module 151 of the head mounted display 100a transmits the calculated angles as direction data to the server for three-dimensional output 10 and identification data indicating the identifier of this head mounted display 100a (step S16).

The direction data receiving module 22 of the server for three-dimensional output 10 receives the direction data and the identification data transmitted from the head mounted display 100a. The avatar changing module 23 of the server for three-dimensional output 10 identifies avatar data associated with the identification data stored in the identifier table based on the received direction data and identification data and changes the avatar data contained in the screen data (step S17). In the step S17, the avatar changing module 23 acquires the angles of the turn in the yaw direction and the pitch direction of the head mounted display 100a based on the received direction data and changes the direction of the head of the avatar data by only the acquired angles to generate newly changed avatar data.

The screen data changing module 24 of the server for three-dimensional output 10 changes the screen data based on the received direction data (step S18). In the step S18, the screen data changing module 24 acquires the angles of the turn in the yaw direction and the pitch direction of the head mounted display 100a based on the received direction data and changes the screen data displayed on the head mounted display 100a by only the acquired angles to generate newly changed screen data.

The screen data transmitting module 21 of the server for three-dimensional output 10 transmits the changed screen data to the head mounted display 100a with the received identification data and the previous screen containing the newly changed avatar data to another head mounted display 100b (step S19).

The screen data receiving module 150 of the head mounted display 100a receives the screen data transmitted from the server for three-dimensional output 10. The screen display module 160 of the head mounted display 100 displays the virtual three-dimensional space shown in FIG. 8 based on the received screen data (step S20).

Figure 8:
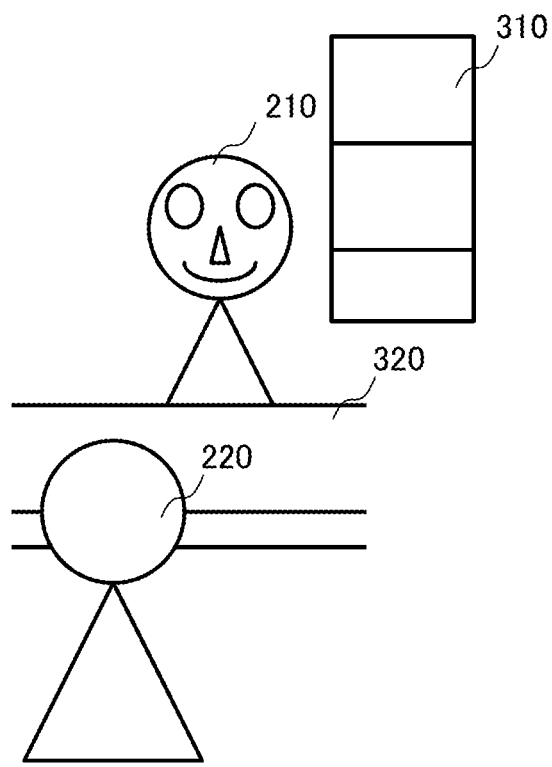

FIG. 8 shows the screen that the user who wears the head mounted display 100a looks at. Specifically, FIG. 8 shows that the screen display module 160 of the head mounted display 100a changes the displaying screen because the user looks to the avatar 210. In FIG. 8, the screen display module 160 displays avatars 210 and 220 and articles 310 and 320. The screen display module 160 changes the screen of the virtual three-dimensional space according to the direction of the user's face.

The screen data receiving module 150 of the head mounted display 100b receives the screen data transmitted from the server for three-dimensional output 10. The screen display module 160 of the head mounted display 100b displays the virtual three-dimensional space shown in FIG. 9 based on the received screen data (step S21).

Figure 9:
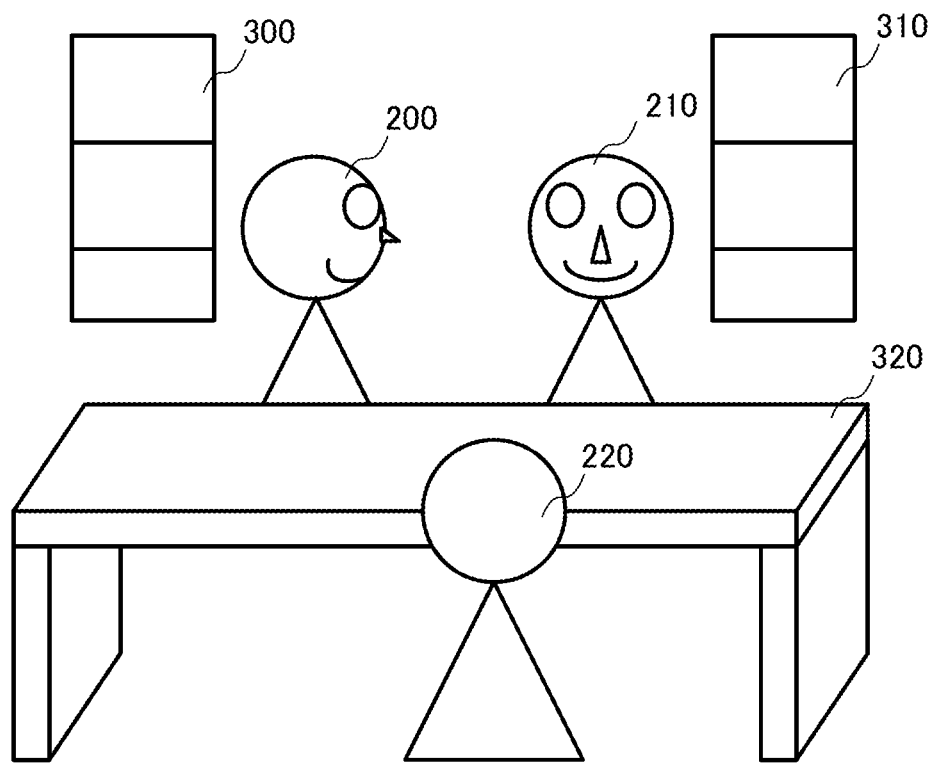

FIG. 9 shows the screen that the user who wears the head mounted display 100b looks at. In FIG. 9, the screen display module 160 of the head mounted display 100b shows that the avatar 200 looks to the avatar 210. The screen display module 160 displays avatars 200, 210, and 220 and articles 300, 310, and 320 in the virtual three-dimensional space.

To achieve the means and the functions that are described above, a computer (including a CPU, an information processor, and various terminals) reads and executes a predetermined program. For example, the program is provided in the form recorded in a computer-readable medium such as a flexible disk, CD (e.g. CD-ROM), and DVD (e.g. DVD-ROM, DVD-RAM). In this case, a computer reads a program from the record medium, forwards and stores the program to and in an internal or an external storage, and executes it. The program may be previously recorded in, for example, a storage (recording medium) such as a magnetic disk, an optical disk, and a magnetic optical disk and provided from the storage to a computer through a communication line.

The embodiments of the present invention are described above. However, the present invention is not limited to the above-mentioned embodiments. The effects described in the embodiments of the present invention are only the most preferable effect produced from the present invention. The effects of the present invention are not limited to those described in the embodiments of the present invention.

REFERENCE SIGNS LIST

10 Server for three-dimensional output
100 Head mounted display

What is claimed is:
1. A server for three-dimensional output, the server being communicatively connected with a head mounted display and outputting full dome three-dimensional space data as virtual or augmented reality corresponding to a user's line of sight, comprising:
a screen data transmitting unit that sequentially transmits screen data to be output to and displayed on the head mounted display;

a direction data receiving unit that receives data on the turn in the yaw direction and the pitch direction of the head mounted display from the head mounted display;

a screen data changing unit that changes the screen data based on the received turn in the yaw direction and the pitch direction of the head mounted display; and an avatar data changing unit that changes avatar data on the user of the head mounted display based on the received turn in the yaw direction and the pitch direction of the head mounted display.

2. The server according to claim 1, wherein the avatar data changing unit changes the direction of the head of the avatar data.

3. The server according to claim 1, further comprising a device identifying module that acquires identification information of each of a plurality of head mounted displays connected with the server, and stores the device identification information in association with avatar information of the user of a corresponding head mounted display.

4. The server according to claim 3, wherein the direction data receiving unit further receives the device identification information of the head mounted display from the head mounted display transmitting the data on the turn, and wherein the avatar data changing unit identifies the avatar data of the avatar information associated with the device identification information.

5. The server according to claim 4, wherein the screen data transmitting unit that transmits the changed screen data to the head mounted display of the received device identification information, and transmits the changed screen data together with the changed avatar data to other head mounted display.

6. A method for three-dimensional output by a server, the method outputting full dome three-dimensional space data as virtual or augmented reality corresponding to a user's line of sight, comprising:

sequentially transmitting screen data to be output to and displayed on the head mounted display;

receiving data on the turn in the yaw direction and the pitch direction of the head mounted display from the head mounted display;

changing the screen data based on the received turn in the yaw direction and the pitch direction of the head mounted display; and changing avatar data on the user of the head mounted display based on the received turn in the yaw direction and the pitch direction of the head mounted display.

7. The method according to claim 6, further comprising:

acquiring identification information of each of a plurality of head mounted displays connected with the server; and storing the device identification information in association with avatar information of the user of a corresponding head mounted display.

8. The method according to claim 7, further comprising:

receiving the device identification information of the head mounted display from the head mounted display transmitting the data on the turn; and identifying the avatar data of the avatar information associated with the device identification information.

9. The method according to claim 8, further comprising:

transmitting the changed screen data to the head mounted display of the received device identification information; and transmitting the changed screen data together with the changed avatar data to other head mounted display.

* * * * *